(12) United States Patent
Manohar et al.

(10) Patent No.: US 10,523,114 B1
(45) Date of Patent: Dec. 31, 2019

(54) DECOUPLING CIRCUITS FOR CONVERTERS

(71) Applicant: Texas Instruments Incorporated, Dallas, TX (US)

(72) Inventors: Sujan Kundapur Manohar, Dallas, TX (US); Yogesh K. Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/205,200

(22) Filed: Nov. 29, 2018

(51) Int. Cl.
| | |
|---|---|
| *H02M 1/44* | (2007.01) |
| *H02M 1/32* | (2007.01) |
| *H02M 3/155* | (2006.01) |
| *H02M 1/00* | (2006.01) |
| *H02M 3/07* | (2006.01) |
| *G05F 3/20* | (2006.01) |
| *G05F 1/569* | (2006.01) |

(52) U.S. Cl.
CPC .............. *H02M 1/44* (2013.01); *H02M 1/32* (2013.01); *H02M 3/155* (2013.01); *G05F 1/569* (2013.01); *G05F 3/205* (2013.01); *H02M 3/07* (2013.01); *H02M 2001/0048* (2013.01); *H02M 2001/322* (2013.01)

(58) Field of Classification Search
CPC ... H02M 2001/322; H02M 3/07; G05F 3/205; G05F 1/569
USPC .............................. 323/276; 327/536; 363/62
See application file for complete search history.

(56) References Cited

U.S. PATENT DOCUMENTS

| | | | | |
|---|---|---|---|---|
| 2009/0278520 | A1* | 11/2009 | Perreault | H02M 3/07 323/282 |
| 2009/0296431 | A1* | 12/2009 | Borisov | H02M 7/103 363/62 |
| 2014/0145683 | A1* | 5/2014 | Mancic | H02M 3/07 320/139 |
| 2015/0214848 | A1* | 7/2015 | Umetani | H02M 3/07 363/21.12 |

* cited by examiner

*Primary Examiner* — Gary A Nash
(74) *Attorney, Agent, or Firm* — Michael A. Davis, Jr.; Charles A. Brill; Frank D. Cimino

(57) ABSTRACT

Described herein is a technology for implementing a decoupling circuit (104) to increase reliability of a DC-DC power converter (100). To absorb an overshoot transient voltage, the decoupling circuit includes a first capacitor (214) and a second capacitor (216) that charge energy during a short burst of upward electrical energy. During an undershoot transient voltage, however, the first capacitor and second capacitor discharge energy to a transistor (108). In certain embodiment, such as the transistor that requires higher voltage switching, the decoupling circuit is connected in series with another decoupling circuit.

18 Claims, 5 Drawing Sheets

DECOUPLING CIRCUITS FOR CONVERTERS

BACKGROUND

With the proliferation of portable devices such as smart phones, tablets, ultra-books etc. there continues to be a need for efficient integrated power management circuits. For example, in the effort to increase the power density of DC-DC converters or to have more power in decreasing areas, higher power density converters have been implemented. However, with higher power density converters, parasitic elements have to be minimized to reduce power loss and improved reliability. Energy stored in parasitic elements can supply bondwire inductance cause ringing when high side transistors (e.g. MOSFET) are switched on/off, causing voltage stress on the transistors.

In electrical networks, an electronic or electrical component can have parasitic elements that are not desirable for the component's intended purpose. The parasitic elements can take the form of parasitic resistance, parasitic inductance or parasitic capacitance. In semiconductor devices, these parasitic elements can be generated from the electronic components, and/or the mounting board. The generated parasitic elements can affect operations and performance of the semiconductor device.

Component designers strive to minimize the effects of the generated parasitic elements but are unable to completely eliminate them. High voltage stress across switches and hard switching are some examples of main drawback of present technologies to avoid the generated parasitic elements.

FIG. 1A shows a prior art conventional DC-DC buck converter. Prior art solutions have included adding an external decoupling capacitor close to the supply PVIN; however this does not solve the problem of package bondwire inductance (~1-3 nH), as represented by Lpackage.

Conventionally high voltage ringing at the drain of high side MOSFET is mitigated by switching the high-side slowly and/or choosing a higher voltage rated power MOSFET. Gradual switching of the power MOSFET increases current-voltage (IV) overlap loss during transition. However, higher voltage power MOSFETs require increased area. Therefore, conventional methods either reduce achievable power efficiency or increase area of the DC-DC.

As shown in FIG. 1A Lboard is inductance from PCB routings and Lpackage is inductance from package bondwire. During turn on of high side device (HSD), Lpackage/Lboard causes undershoots in PVIN while inductances build current and overshoots once inductances have built current. As represented by the waveforms of FIG. 1B, during a turn off event of HSD, PVIN overshoots until the energy in Lpackage/Lboard is discharged either through slow turn off of the HSD or parasitic resistances in the PVIN-PGND power loop.

Conventionally, the driver needs to be slowed down to reduce PVIN transients; however, this degrades power efficiency. Alternatives include the use of higher voltage rated power MOSFET that are capable to handle voltage overshoots during turn on and off events; however this alternative requires greater area and can affect performance. In addition, in such conventional approaches, the energy stored in Lpackage is lost. For example, if Vout=1V, 5 A load, Lpackage=2 nH, Fsw=4.4 MHz. The power lost is 110 mW or 2.2% of output power. This can be significant loss in low voltage (Vin: 2.7V-5.5V) high efficiency DC-DC converters.

SUMMARY OF THE INVENTION

Disclosed is a device that includes a decoupling circuit to increase reliability in a DC-DC power converter. The decoupling circuit includes a first diode, a second diode, and a third diode connected in series with one another. A cathode of the first diode is connected to a voltage supply, and the second diode is connected between the first diode and third diode. A first capacitor connected in parallel with the first diode and second diode; and a second capacitor is connected in parallel with the second diode and third diode. The first capacitor and second capacitor charge and store energy during an overshoot transient voltage from the voltage supply, wherein the first capacitor and second capacitor discharge energy to a transistor during an undershoot transient voltage.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein is a technology for implementing a decoupling circuit to increase reliability of a converter. The decoupling circuit includes a first diode, a second diode, and a third diode that are connected in series with one another. A cathode side of the first diode is connected to a voltage supply, while the second diode is connected in between the first diode and third diode with an anode side of the third diode connected to a ground. The decoupling circuit further includes a first capacitor connected in parallel with the first diode and second diode; and a second capacitor that is connected in parallel with the second diode and third diode.

As described herein, the first capacitor and second capacitor charge and store (electrical) energy during a short burst of upward electrical energy (i.e., overshoot transient voltage). During a short burst of downward electrical energy (i.e., undershoot transient voltage), however, the first capacitor and second capacitor discharge energy towards a transistor, which generates a converter input for the converter e.g., buck converter. In an embodiment, the transistor includes a high-side switch and a low-side switch. In this embodiment, the overshoot transient voltage may be generated when the high-side switch is turned "OFF" while the undershooting voltages may be generated when the high-side switch is turned "ON."

For high voltage switching transistors, the above decoupling circuit is stacked up or connected in series with another decoupling circuit. Each of these decoupling circuits include the same circuit configuration. That is, each decoupling circuit includes the first diode, second diode, third diode, first capacitor, and second capacitor.

Figure 1A:
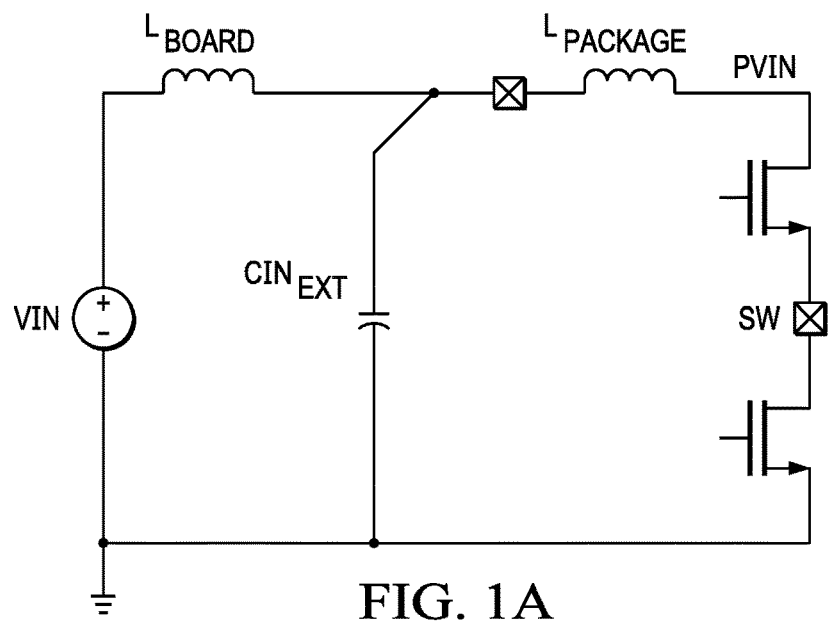
FIG. 1A is a block diagram of a prior art DC-DC buck converter.
Figure 1B:
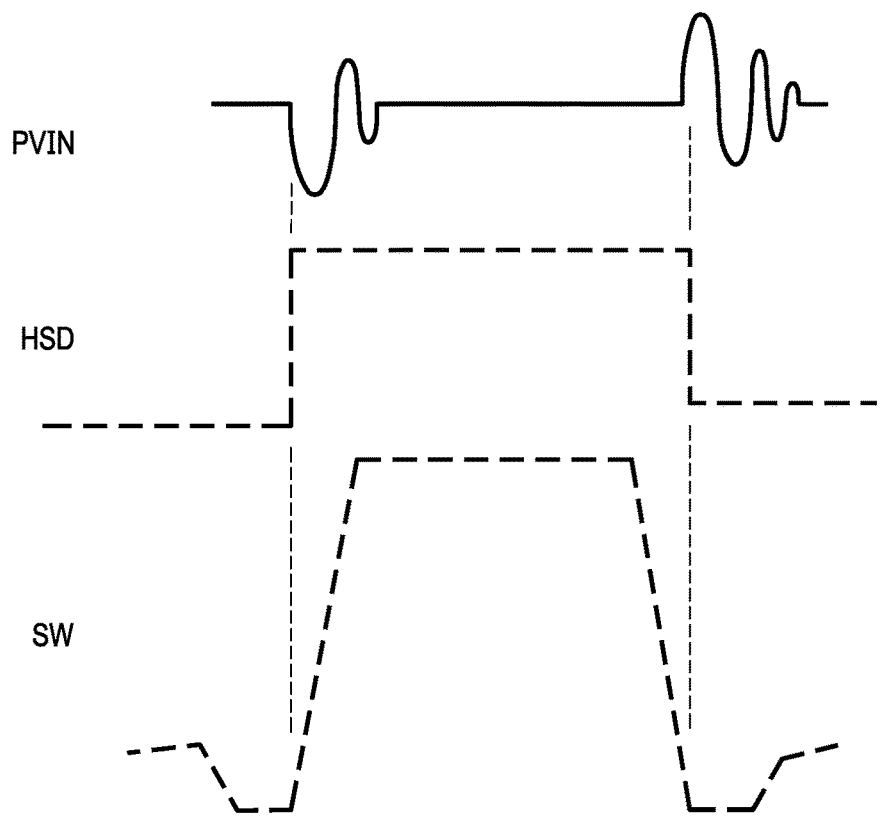
FIG. 1B are waveforms showing turn on and turn off a high side device, switch, and effect on supply voltage PVIN.
Figure 2:
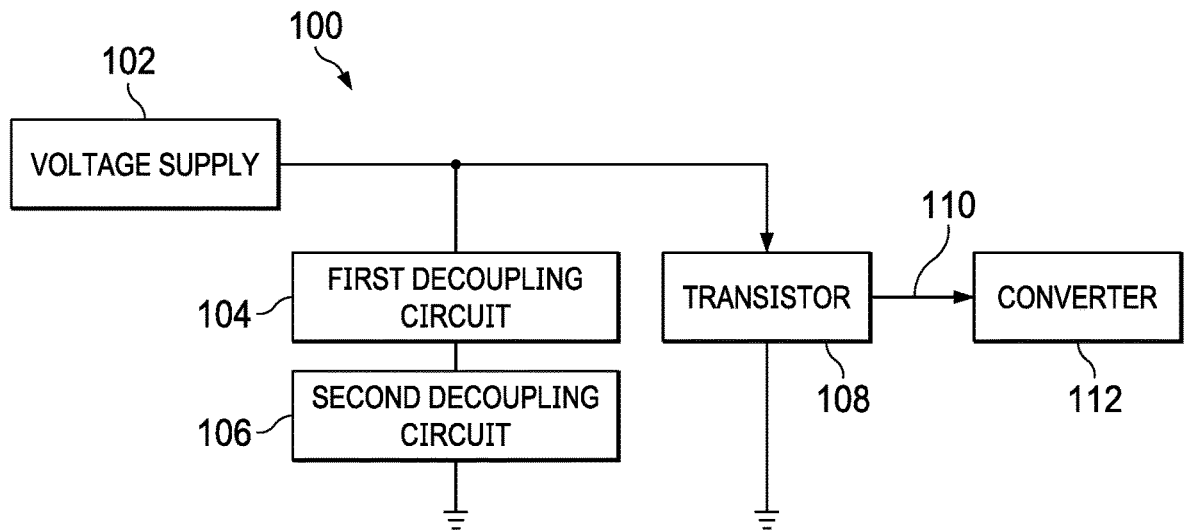
FIG. 2 is a block diagram of a converter circuit as described in present implementations herein.

FIG. 2 shows an example block diagram of a converter circuit 100 as described in present implementations herein. In an embodiment, the converter circuit 100 uses at least one decoupling circuit in order to increase reliability and efficiency of the converter circuit 100. The converter circuit 100 can be a buck converter, a boost converter, or the like.

As shown, the converter circuit 100 includes a voltage supply 102, a first decoupling circuit 104, a second decoupling circuit 106, and a transistor 108 that generates a converter input 110 to a converter 112. The converter input 110, for example, can be further processed to increase amplitude, decrease amplitude, and the like, by the converter 112.

The voltage supply 102 generates a voltage supply that is received by the transistor 108. For example, the voltage supply can be a direct current (DC) voltage that is used to turn the transistor 108 "ON" and "OFF." In this example, the transistor 108 can further amplify the DC voltage as the converter input 110. The transistor 108 may further include a high-side switch and a low-side switch as further described in FIG. 2. A common node between the high-side switch and low-side switch may supply the converter input 110 to the converter 112. In an embodiment, a combination of the transistor 108 and the converter 112 forms the buck converter as described herein.

In certain implementations, the first decoupling circuit 104 is coupled to the transistor 108, such that one end (e.g., high-side switch) of the transistor 108 is connected to the voltage supply 102, and one end of the first decoupling circuit 104 is connected to the voltage supply 102. In other words, the voltage supply 102, first decoupling circuit 104, and transistor 108 are connected in parallel with each other.

In certain instances, parasitic inductances from printed circuit board (PCB) routings and from package bond wires can generate transient overshooting and undershooting of voltages during a fast switching action of the transistor 108. For example, the overshooting voltages may be generated when the high-side switch is turned "OFF" while the undershooting voltages may be generated when the high-side switch is turned "ON." In this example, the first decoupling circuit 104 absorbs the effects of overshooting and undershooting transient voltages as described herein.

The noise generated by the parasitic inductances can include overshoot (i.e., positive) and undershoot (i.e., negative) transient voltages. The overshoot transient voltage includes a short spike or a sudden burst of upward electrical energy from the voltage supply 102. On the other hand, undershoot transient voltage includes a short downward spike or sudden burst of downward electrical energy. In both cases, the upward or downward spike in electrical energy can be random and of short durations sufficient to generate the noise or interferences on the converter circuit 100.

As described herein, the first decoupling circuit 104 is configured to neutralize effects of the overshoot transient voltages. For example, the first decoupling circuit 104 absorbs the effects of the overshoot transient voltages by using the short burst of upward electrical energy to charge capacitor components (not shown) on the first decoupling circuit 104. In this example, the short burst of overshoot transient voltages will be neutralized before reaching the transistor 108. That is, the short burst of upward electrical energy will be filtered by the first decoupling circuit 104.

During undershoot transient voltages, the first decoupling circuit 104 is configured to discharge electrical energy from the capacitor components. For example, the capacitor components discharge the energy towards the transistor 108. In this example, the effects of short burst downward electrical energy to the transistor is minimized or cancelled.

As described herein, the second decoupling circuit 106 includes similar circuit configurations and number of components (not shown) as those of the first decoupling circuit 104. In an embodiment, the second decoupling circuit 106 is connected in series with the first decoupling circuit 104 for the transistor 108 that requires higher voltage switching. When series connected, one end of the second decoupling circuit 106 is connected to a ground, while another end of the second decoupling circuit 106 is connected to the first decoupling circuit 104.

For example, the transistor 108 requires a higher amount of voltage to turn "ON" and "OFF." In this example, the higher amount of overshoot and undershoot transient voltages can be generated as well by the parasitic elements or inductances on the converter circuit 100. To this end, the series connected first decoupling circuit 104 and second decoupling circuit 106 are utilized to absorb the sudden burst of upward or downward electrical energy from the voltage supply.

The transistor 108 is coupled to the voltage supply 102 and receives the voltage supply for its operation. For example, the voltage supply 102 supplies a certain amount of voltage to turn "ON" the transistor 108. Alternatively, the voltage supply 102 does not supply voltages on the transistor 108 to turn "OFF." In this example, the transistor 108 includes a metal-oxide-semiconductor field-effect-transistor (MOSFET), or any other types of transistors.

The converter 112 processes the converter input 110 from the transistor 108. For example, the converter 112 that is coupled to the transistor 108 forms the buck converter. In this case, the buck converter performs a step down operation on the converter input 110.

Figure 3:
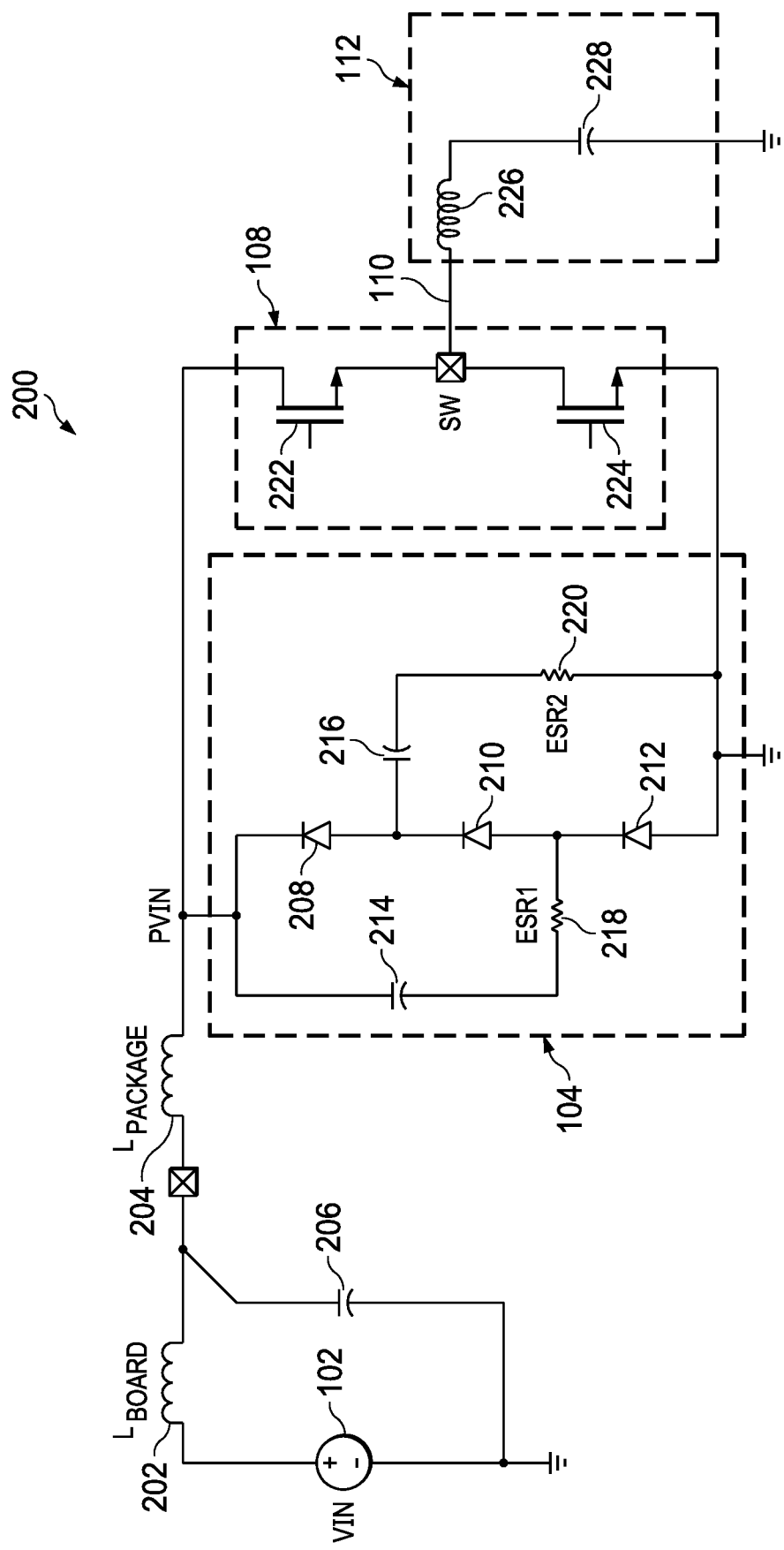
FIG. 3 is a diagram buck converter with a decoupling circuit as described herein.

FIG. 3 shows an example buck converter circuit 200 with a decoupling circuit as described herein. In an embodiment, the example buck converter circuit 200 utilizes a single decoupling circuit such as the decoupling circuit 104 to neutralize the noise due to the parasitic elements on the buck converter circuit 200.

As shown, a first parasitic inductance 202 can be generated by a mounting board for different electronic components of the buck converter circuit 200, while a second parasitic inductance 204 can be generated by packaging bond wires on the buck converter circuit 200. The first parasitic inductance 202 and the second parasitic inductance 204 may be collectively called herein as supply loop inductance. A capacitor 206 can include a parasitic capacitance, or it can be used to generate resonant frequency on the part of the voltage supply 102.

For the transistor 108 that uses low amount of voltage switching, the single decoupling circuit such as the first decoupling circuit 104 can be utilized to absorb the overshoot transient voltages the and gives back energy during occurrence of the undershoot transient voltages. The overshooting and undershooting transient voltages, for example, may be generated by the supply loop inductance during fast switching of the high-side switch of the transistor 108.

As shown, the first decoupling circuit 104 includes a monolithic first diode 208, a monolithic second diode 210, and a monolithic third diode 212 that are connected in series with one another. In other words, a cathode of the first diode 208 is connected to the high-side switch of the transistor 108, while an anode of the third diode 212 is connected to the ground. The second diode 210 is connected in between the first diode 208 and third diode 212 to form the series connection.

The first decoupling circuit 104 further includes a monolithic first capacitor 214, such as a trench capacitor or any low voltage on die capacitor, that is connected in parallel with the first diode 208 and second diode 210. Furthermore still, a monolithic second capacitor 216 is connected in parallel with the second diode 210 and third diode 212. The monolithic first capacitor 214 and second capacitor 216 may include low voltage high density capacitors for decoupling power converters. Internal resistances 218 and 220 can be further observed on the first decoupling circuit 104.

The transistor 108 such as MOSFETs 222 and 224 can receive the voltage supply from the high side, which is at drain side of the MOSFET 222. As described herein, the MOSFET 222 includes the high-side switch while the MOSFET 224 includes a low-side switch of the transistor 108 that supplies the converter input 110 to an LC circuit such as inductor 226 and capacitor 228 as shown.

In an implementation, the parasitic elements on the buck converter circuit 200 such the first parasitic inductance 202, second parasitic inductance 204, etc. may facilitate the generation of the upward and downward surges of electrical energy during the fast switching operations of the converter circuit 200. In this implementation, the upward and downward surges can be treated as overshoot and undershoot transient voltages, respectively.

For example, during an occurrence of the overshoot transient voltages, the short duration of high electrical energy will pass through the first capacitor 214, the second diode 210, and the second capacitor 216. In other words, the first diode 208 and the third diode 212 will be reversed biased, while the second diode 210 is forward biased. In this example, the first capacitor 214 and the second capacitor 216 charge and store electrical energy from the voltage supply 102. In this manner, the effect of the overshoot transient voltages will be absorbed by the charging of the first capacitor 214 and the second capacitor 216.

In an implementation, the first capacitor 214 and the second capacitor 216 can store equal amount of the voltage supply. For example, when the voltage drop on the internal resistances 218 and 220 are negligible in value, and that the second diode 210 is shorted by a parallel connected switch (not shown), then each of the first capacitor 214 and the second capacitor 216 can charge about half the value of the voltage supply.

During the occurrence of undershoot transient voltages, the short burst of downward electrical energy can affect the switching of the transistor 108. In this regard, the first capacitor 214 and the second capacitor 216 discharge the stored energy towards the transistor 108 during undershoot transient voltages. In this manner, the effect of undershoot transient voltages will be absorbed by the discharging of the electrical energy by the first capacitor 214 and the second capacitor 216.

As described herein, the transistor 108 can include the MOSFETs 222 and 224 that can supply a certain voltage or current as the converter input 110 to the LC circuit-inductor 226 and capacitor 228. In this regard, the LC circuit-inductor 226 and capacitor 228 can be used to filter frequency of the converter input 110. Furthermore, the LC circuit-inductor 226 and capacitor 228 can perform a step down on the converter input 110.

Figure 4:
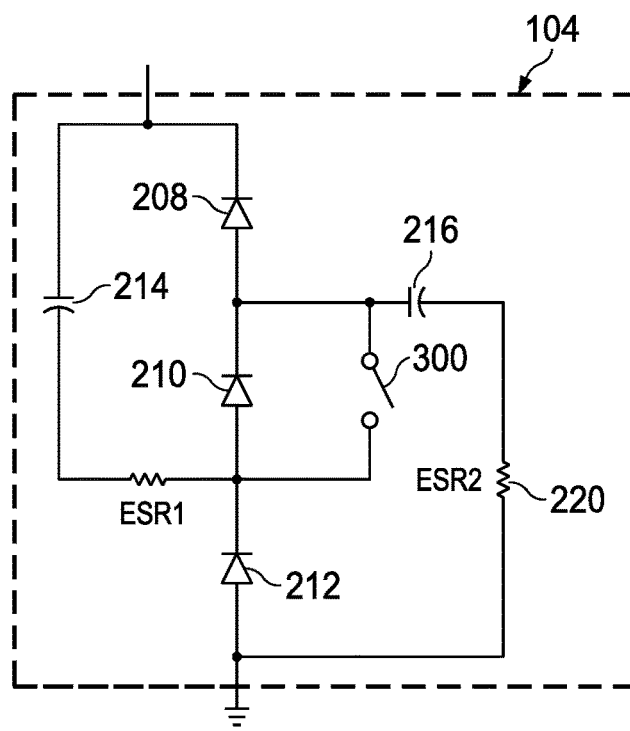
FIG. 4 is a diagram of the first decoupling circuit as described herein.

FIG. 4 illustrates an example embodiment of the first decoupling circuit 104 as described herein. As shown, an additional switch 300 is connected across the second diode 210. The switch 300, at closed position, forms a short circuit loop across the second diode 210 such that the voltage drop across the second diode 210 becomes negligible.

For example, when the high-side switch MOSFET 222 of the transistor 108 is turned "OFF", and the first capacitor 214 and the second capacitor 216 are charging during the overshoot transient voltages, the switch 300 is closed so that the voltage drop across the second diode 210 drops to almost zero volts. In this example, the first capacitor 214 and the second capacitor 216 store equal amounts of the voltage supply. Thereafter, and before the high-side switch MOSFET 222 of the transistor 108 is turned "ON", the switch 300 is opened and the decoupling circuit 104 goes back to its regular operation. In other words, the first capacitor 214 and the second capacitor 216 discharges electrical energy during undershoot transient voltages.

Figure 5:
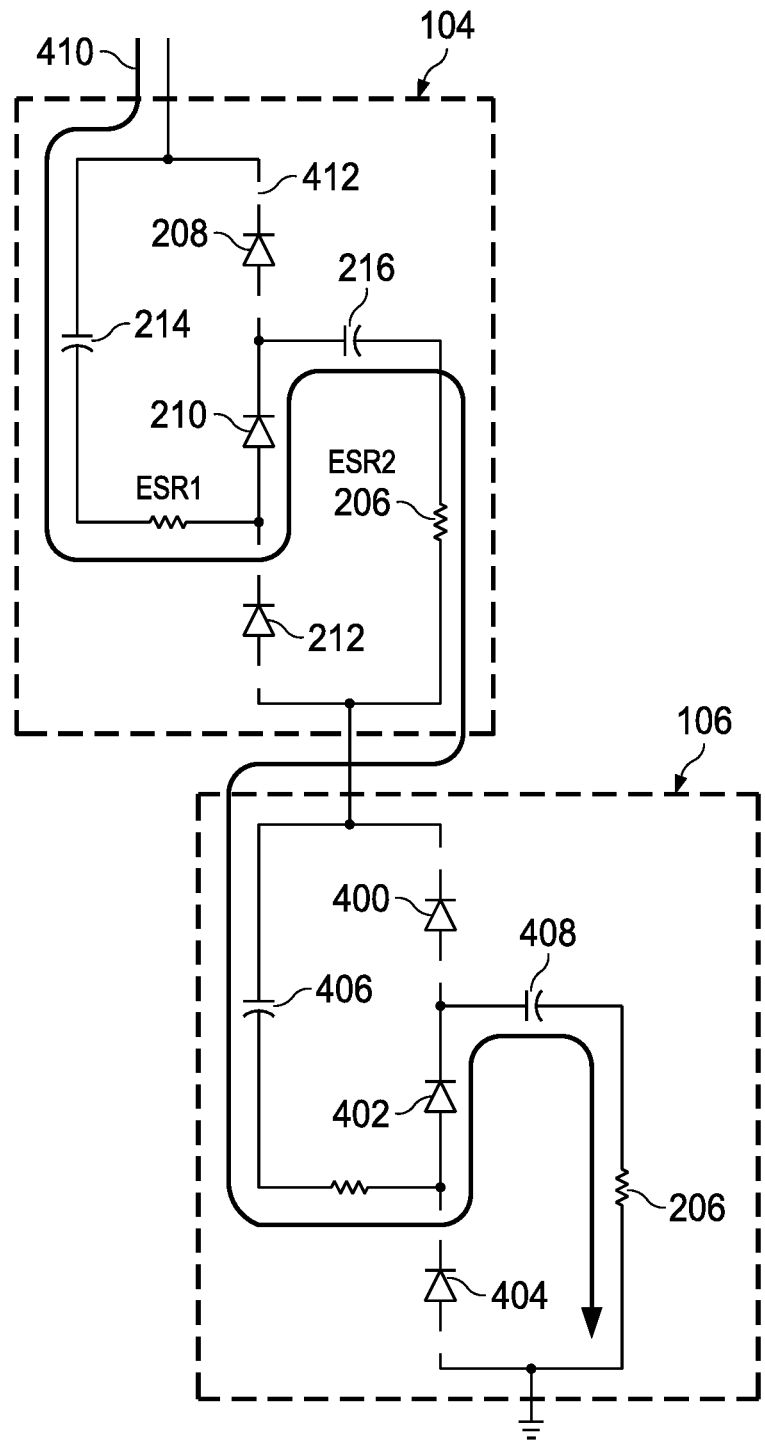
FIG. 5 is a diagram of a charging operation during an overshoot transient voltage event of the decoupling circuit as described herein.

FIG. 5 illustrates an example implementation of a charging operation during an overshoot transient voltage event of the decoupling circuit as described herein. As shown, the first decoupling circuit 104 is connected in series with the second decoupling circuit 106. Furthermore, a circuit configuration of the first decoupling circuit 104 is the same as that of the second decoupling circuit 106. To illustrate, the first diode 208, second diode 210, and third diode 212 of the first decoupling circuit 104 include the same series connected configuration as that of fourth diode 400, fifth diode 402, and sixth diode 404 of the second decoupling circuit 106.

Similarly, the first capacitor 214 and the second capacitor 216 of the first decoupling circuit 104 include the same circuit configuration as that of third capacitor 406 and fourth capacitor 408 of the second decoupling circuit 106. That is, the third capacitor 406 is connected in parallel with the fourth diode 400 and fifth diode 402, while the fourth capacitor 408 is connected in parallel with the fifth diode 402 and sixth diode 404.

As described herein, and during the overshoot transient voltages, an arrow 410 illustrates the charging of the first capacitor 214, second capacitor 216, third capacitor 406, and fourth capacitor 408. The arrow 410 passes through the forward biased second diode 210 and forward biased fifth diode 402. That is, the first diode 208, third diode 212, fourth diode 400, and sixth diode 404 are all reversed biased. The reverse biasing is illustrated by an arrow 412 that shows disconnected reverse biased diodes during the charging process.

Figure 6:
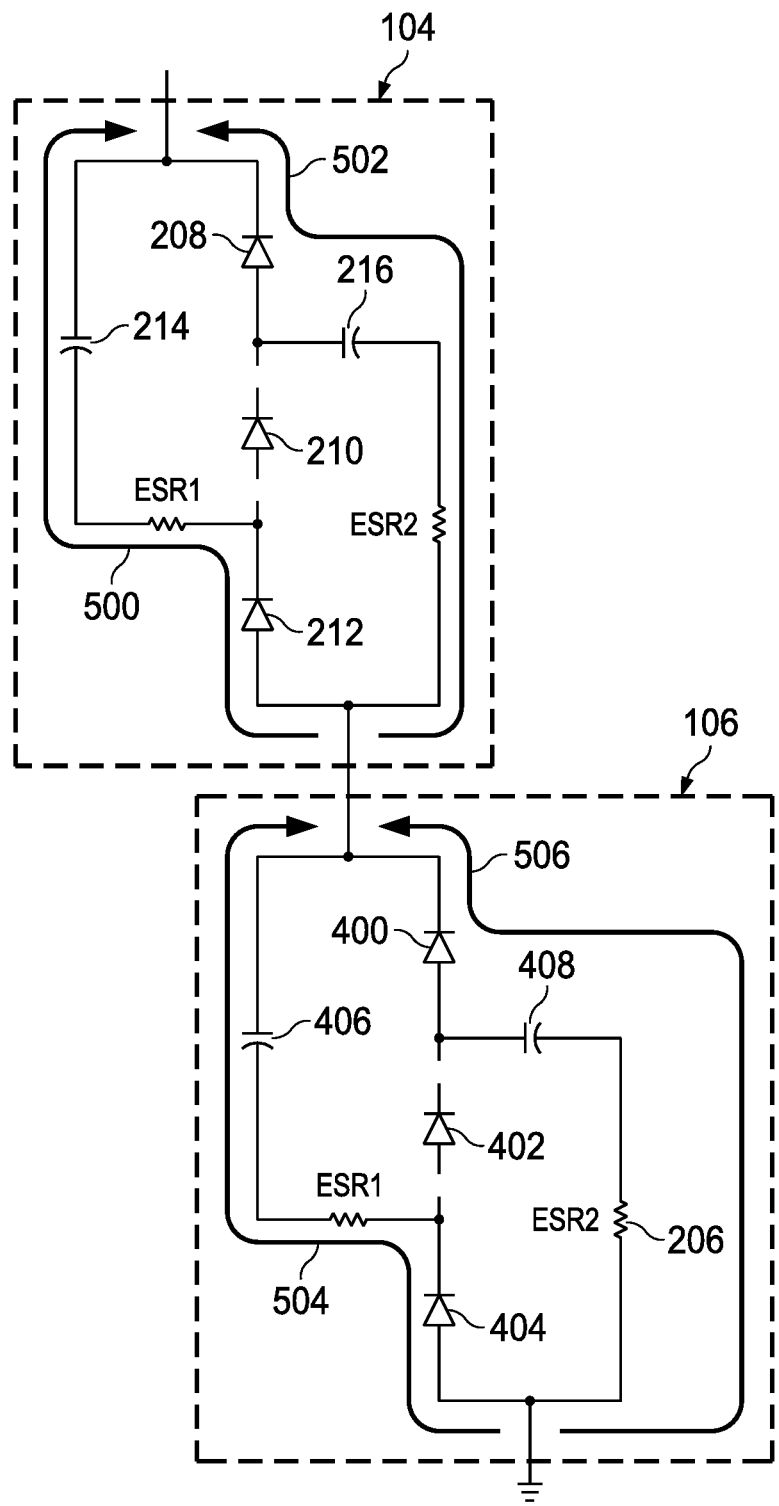
FIG. 6 is a diagram of a discharging operation during an undershoot transient voltage event of the decoupling circuit during as described herein.

FIG. 6 illustrates an example implementation of a discharging operation during an undershoot transient voltage event of the decoupling circuit as described herein. As shown, the first decoupling circuit 104 is connected in series with the second decoupling circuit 106. Furthermore, the circuit configuration of the first decoupling circuit 104 is the same as that of the second decoupling circuit 106. To illustrate, the first diode 208, second diode 210, and third diode 212 of the first decoupling circuit 104 include the same series connected configuration as that fourth diode 400, fifth diode 402, and sixth diode 404 of the second decoupling circuit 106.

Similarly, the first capacitor 214 and the second capacitor 216 of the first decoupling circuit 104 include the same circuit configuration as that of third capacitor 406 and fourth capacitor 408 of the second decoupling circuit 106. That is, the third capacitor 406 is connected in parallel with the fourth diode 400 and fifth diode 402, while the fourth capacitor 408 is connected in parallel with the fifth diode 402 and sixth diode 404.

As described herein, and during the undershoot transient voltages, the first capacitor 214, second capacitor 216, third capacitor 406, and fourth capacitor 408 discharge electrical energy towards the transistor 108. As shown, a first arrow 500 illustrates the discharging of the energy by the first capacitor 214; a second arrow 502 shows the discharging of the energy by the second capacitor 218; a third arrow 504 shows the discharging of the energy by the third capacitor 406; and a fourth arrow 506 illustrates the discharging of the energy by the fourth capacitor 408.

As described, the described technology can recover energy stored in parasitic supply inductance of bondwire inductance (e.g., Lpackage/Lboard), and can lead to efficiency enhancement.

Furthermore, the described technology describes methods to configure capacitors in series during overshoots, such that voltage across each capacitor is reduced to half and enables use of a low voltage capacitor for power supply to power ground decoupling. Yet furthermore, the technology describes the use of high density low voltage trench or other on die capacitors for input decoupling of DC-DC converters. Elimination of the adverse transient effects of Lpackage/Lboard may be observed. Auto series-parallel configuration requires no active voltage balance circuits to manage the capacitors, and the values of the capacitors can be chosen according to power MOSFET voltage rating.

During the discharging of the electrical energy by the first capacitor 214, second capacitor 216, third capacitor 406, and fourth capacitor 408, the second diode 210 and the fifth diode 402 are reversed biased. The reversed biased is illustrated by open circuit second diode 210 and open circuit fifth diode 402. On the other hand, the first diode 208, third diode 212, fourth diode 400, and sixth diode 404 are all in forward biased state.

What is claimed is:

1. A decoupling circuit comprising:
a first diode, a second diode, and a third diode connected in series with one another, a cathode of the first diode adapted to be connected to a voltage supply node, and the second diode connected between the first and third diodes;
a first capacitor connected in parallel with the first and second diodes;
a second capacitor connected in parallel with the second and third diodes, the first and second capacitors adapted to be coupled to the voltage supply node and to a transistor, and the first and second capacitors configured to: charge and store energy during an overshoot transient voltage condition at the voltage supply node; and discharge energy towards the transistor during an undershoot transient voltage condition at the voltage supply node; and
a switch connected across the second diode, the switch configured to close when the transistor is turned OFF.

2. The decoupling circuit of claim 1, wherein the second diode is forward biased when the first and second capacitors charge and store the energy during the overshoot transient voltage condition, and the overshoot transient voltage condition is generated by a supply loop inductance.

3. The decoupling circuit of claim 1, wherein the second diode is reverse biased when the first and second capacitors discharge the energy towards the transistor during the undershoot transient voltage condition, and the undershoot transient voltage condition is generated a supply loop inductance.

4. The decoupling circuit of claim 3, wherein the first and third diodes are forward biased when the first and second capacitors discharge the energy.

5. The decoupling circuit of claim 1, wherein the first, second, and third diodes and the first and second capacitors are monolithic.

6. The decoupling circuit of claim 1, wherein the first and second capacitors are low-voltage high density monolithic capacitors.

7. The decoupling circuit of claim 1, wherein the decoupling circuit is included in a buck converter.

8. The decoupling circuit of claim 1, wherein a second decoupling circuit is connected in series with the decoupling circuit for a higher voltage switching.

9. A device comprising:
a voltage supply node;
a transistor; and
a decoupling circuit coupled to the voltage supply node and to the transistor, the decoupling circuit including:
a first, a second diode, and a third diode connected in series with one another, a cathode of the first diode connected to the voltage supply node, an anode of the third diode connected to a ground node, and the second diode connected between the first and third diodes;
a first capacitor connected in parallel with the first and second diodes;
a second capacitor connected in parallel with the second and third diodes, the first and second capacitors configured to: charge and store energy during an overshoot transient voltage condition at the voltage supply node; and discharge energy towards the transistor during an undershoot transient voltage condition at the voltage supply node; and
a switch connected across the second diode, the switch configured to close when the transistor is turned OFF.

10. The device of claim 9, wherein the second diode is forward biased when the first and second capacitors charge and store the energy during the overshoot transient voltage condition, and the overshoot transient voltage condition is generated by a supply loop inductance.

11. The device of claim 9, wherein the second diode is reversed biased when the first and second capacitors discharge the energy towards the transistor during the undershoot transient voltage condition, and the undershoot transient voltage condition is generated by a supply loop inductance.

12. The device of claim 11, wherein the first and third diodes are forward biased when the first and second capacitors discharge the energy.

13. The device of claim 9, wherein the first, second, and third diodes and the first and second capacitors are monolithic.

14. A stacked circuit comprising:
a first decoupling circuit; and
a second decoupling circuit coupled to the first decoupling circuit;
each of the first and second decoupling circuits including:
a respective first diode, a respective second diode, and a respective third diode connected in series with one another, a cathode of the first diode adapted to be connected to a voltage supply, and the second diode connected between the first and third diodes;
a respective first capacitor connected in parallel with the first and second diodes;

a respective second capacitor connected in parallel with the second and third diodes, the first and second capacitors adapted to be coupled to the voltage supply node and to a transistor, and the first and second capacitors configured to: charge and store energy during an overshoot transient voltage condition at the voltage supply node; and discharge energy towards the transistor during an undershoot transient voltage condition at the voltage supply node; and a respective switch connected across the second diode, the switch configured to close when the transistor is turned OFF.

15. The stacked circuit of claim 14, wherein an anode of the third diode of the first decoupling circuit is connected to the second decoupling circuit.

16. The stacked circuit of claim 14, wherein the second diode of each of the first and second decoupling circuits is forward biased during charging of energy by the first and second capacitors.

17. The stacked circuit of claim 16, wherein the first and third diodes of each of the first and second decoupling circuits are forward biased when the first and second capacitors discharge the energy.

18. The stacked circuit of claim 14, wherein the transistor is a metal-oxide-semiconductor field-effect-transistor.

* * * * *